United States Patent [19]

Yule

[11] Patent Number: 4,847,807

[45] Date of Patent: Jul. 11, 1989

[54] MULTIPLE DISK MEMORY ACCESS ARRANGEMENT FOR GRIDDED TYPE DATA

[75] Inventor: Raymond C. Yule, La Habra Heights, Calif.

[73] Assignee: Hughes Aircraft Company, Los Angeles, Calif.

[21] Appl. No.: 925,854

[22] Filed: Sep. 11, 1986

[51] Int. Cl.$^4$ .............................................. G06F 9/00
[52] U.S. Cl. .................................................... 364/900
[58] Field of Search ............................... 364/200, 900

[56] References Cited

U.S. PATENT DOCUMENTS 4,513,374 4/1985 Hooks, Jr. ........................ 364/200
4,667,190 5/1987 Fant .................................. 340/727

FOREIGN PATENT DOCUMENTS 0156724 10/1985 European Pat. Off. .

OTHER PUBLICATIONS

SID International Symposium–Digest of Tech. Papers, Apr. 1980 (Coral Gables, Fla., U.S.), R. W. Tracy et al.: "Design Considerations for Low-Cost Digital Light Table Functions," pp. 96–97.

*Primary Examiner*—Gareth D. Shaw
*Assistant Examiner*—John G. Mills
*Attorney, Agent, or Firm*—C. D. Brown; L. A. Alkov; A. W. Karambelas

[57] ABSTRACT

The method and apparatus for storing the data base of gridded type data on a plurality of rotary type data memory devices such that data update to a utilization system, e.g., a computer generated imagery (CGI) processor may be more effectively implemented. For the generalized case of N rotary data memory devices and for a data base of gridded type data which may be represented by rows and columns of data elements, data elements of each row are "mapped" to the memory devices in accordance with a repetitive and cyclical pattern. For example, for each row of the grid, the data for each data element of N successive elements is stored on a different one of the N rotary data memory devices and for successive groups of N elements the data is similarly stored in accordance with a repetitive, cyclical pattern wherein each cycle of the pattern includes N successive elements, the data for each of which is stored on a different one of said rotary data memory devices.

4 Claims, 4 Drawing Sheets

MULTIPLE DISK MEMORY ACCESS ARRANGEMENT FOR GRIDDED TYPE DATA

BACKGROUND OF THE INVENTION

This invention relates generally to multiple rotary type memory arrangements including magnetic and optical disk types and more particularly to arrangements of such devices for processing voxel or gridded type data.

In applications such as computer generated imagery (CGI) systems dynamic random access memories are sometimes utilized to store an active data base used for immediate processing and the active data base is updated as required by high speed data transfer from a much larger data base which includes the entire imaging area of interest (gaming area). In such systems which are based on a voxel or gridded type data structure the data is organized in accordance with a two dimensional grid representative of ground coordinates with each grid location having associated therewith data base description elements (voxels), which data, e.g., elevation, color and/or intensity is processed by the GCI system to provide imaging data.

Generally, disk type memory devices including magnetic and optical disk types are substantially less expensive than equivalent capacity solid state random access memories; and voxel based CGI systems, for example, are for some applications potentially memory intense. However, due to inherent data retrieval access times for disk memories, e.g., the device's rotational time, seek time and data transfer rate, a single disk type memory may not be suitable for some CGI applications. Hence, an efficient arrangement for accessing a plurality of disk memory devices in parallel would be a useful contribution to the art.

A primary object of the subject invention is to provide an arrangement of multiple rotary memory devices which is a cost effective implementation for large data bases of voxel or gridded type data.

Another object is to efficiently implement multiple parallel accessed rotary type memory devices used for updating processor memories in applications such as CGI systems which has a data structure based on gridded or voxel type data.

A further object is to provide a disk based voxel data management arrangement which is more cost effective for certain CGI system applications than memories implemented by means of all random access memories (RAM).

SUMMARY OF THE INVENTION

The subject invention provides the method and apparatus for storing the data base of gridded type data on a plurality of rotary type data memory devices such that data update to a utilization system, e.g., a CGI processor may be more effectively implemented. An aspect of the invention is the realization that due to the relationships of the data update requirement to the two dimensional grid representation of the data, increased efficiency, i.e., faster access time and/or the need for fewer memory devices can be obtained if data associated with elements defined by the grid are distributed among the various rotary memory devices in accordance with predetermined arrangements. For each data update operation the more evenly the updata data is distributed between the multiple rotary memory devices the more simultaneous accessing of the devices can be performed, hence increasing overall utilization and reducing access time. For the generalized case of N rotary data memory devices and for a data base of or rotary data memory devices and for a data base of gridded type data which may be represented by rows and columns of data elements, in accordance with one method of the invention data elements of each row are "mapped" to the memory devices in accordance with a repetitive and cyclical pattern. For example, for each row of the grid, the data for each data element of N successive elements is stored on a different one of the N rotary data memory devices and for successive groups of N elements the data is similarly stored in accordance with a repetitive, cyclical pattern wherein each cycle of the pattern includes N successive elements, the data for each of which is stored on a different one of said rotary data storage devices. The rotary memory devices may be conventional disk memory storage and retrieval devices, for example, magnetic and/or optical disk memory devices.

BRIEF DESCRIPTION OF THE DRAWINGS

The novel features that are considered characteristic of this invention are set forth with particularity in the appended claims. The invention itself, both as to the organization and method of operation as well as additional objects and advantages thereof, will best be understood from the following description when read in connection with the accompanying drawings in which:

FIG. 2 depicts the grid of a gaming area in which a grid element corresponds to real estate area represented by voxel data and is mapped to (stored on) one of four rotary memory devices in accordance with the numerals in the grid elements;

FIG. 3 depicts the grid of a gaming area in which the voxel data is mapped to (stored on) one of five rotary memory devices in accordance with the numerals in the grid elements;

FIG. 4 depicts the grid of a gaming area in which the voxel data is mapped to (stored on) one of seven rotary memory devices in accordance with the numerals in the grid elements;

FIG. 5 depicts the grid of a gaming area in which the voxel data is mapped to (stored on) one of eleven rotary memory devices in accordance with the numerals in the grid elements.

DESCRIPTION OF THE PREFERRED EMBODIMENT

In applications such as simulator systems or flight trainers, for example, a computer generated image is produced by processing data descriptive of the area within an observer's simulated field of view. In such systems dynamic random access memories may be utilized, for example, to store data for immediate processing, i.e., data sufficient to meet process requirements until the dynamic memory is next updated. The update requirement is determined by the potential change in the observer's simulated field of view between updates. In some such systems the update is accomplished by the system addressing a large capacity memory which contains data for the entire area of interest (gaming area). For such systems based on a voxel or gridded type structure the data is organized in accordance with a two dimensional grid representing ground coordinates with each grid location having associated therewith data base description elements (voxels) which data, e.g., elevation, color and/or intensity, is processed by the computer generated image (CGI) processor of the simulator system to provide imaging data. For example, each grid location may have associated therewith one or more "pages" of data with each page being definitive of 128×128 voxels.

Figure 1:
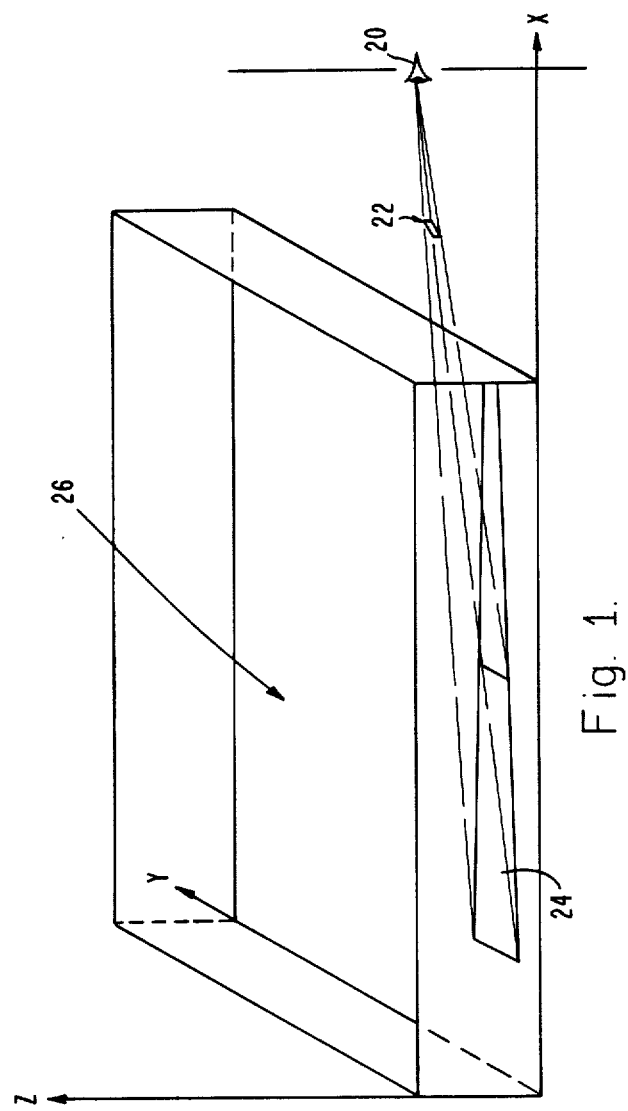
FIG. 1 is a simplified perspective view of the gaming area, e.g., for a CGI system, that is modeled by a voxel data base.

FIG. 1 illustrates a simulated observer's eye position 20, a screen 22 and a projection of the screen 22 onto a gaming area 26. The screen 22 defines the field of view (FOV) for which imagery is to be simulated. The gaming area 26 is defined by voxelized data which is organized in accordance with a two dimensional grid (see FIGS. 2–5) representative of ground coordinates. The area for which updated data will be needed by the GCI processor is determined by the immediate future position of the FOV as the simulation moves eye position 20 and is predictable as an envelope of grid positions, for example see envelope 28 shown in FIG. 4.

Figure 6:
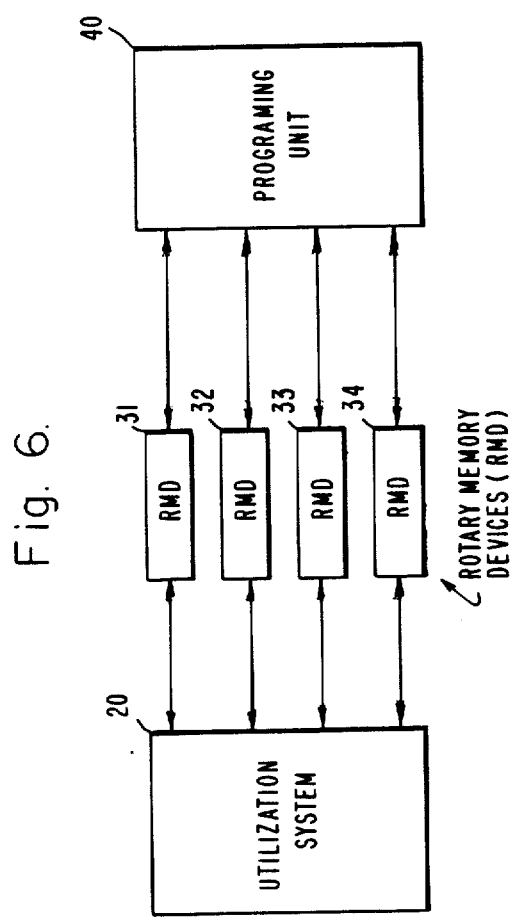
FIG. 6 is a block diagram of a utilization system which is updated by a multiple rotary memory arrangement which in turn was programmed by a programming unit.

An aspect of the subject invention involves a voxel data base to multipe rotary type memory mapping schemes which may be better understood by referring momentarily to FIG. 6. As there shown, a utilization device 20, which may comprise a CGI system addresses in parallel multiple rotary type memory devices 31 through 34 which may be disk type devices such as magnetic and/or optical disks, for example. In response to addresses and commands from the utilization system 20 the memories 31 through 34 retrieve the addressed program into units 31 through 34 by program unit 40 in accordance with the mapping scheme.

Figures 4, 5:
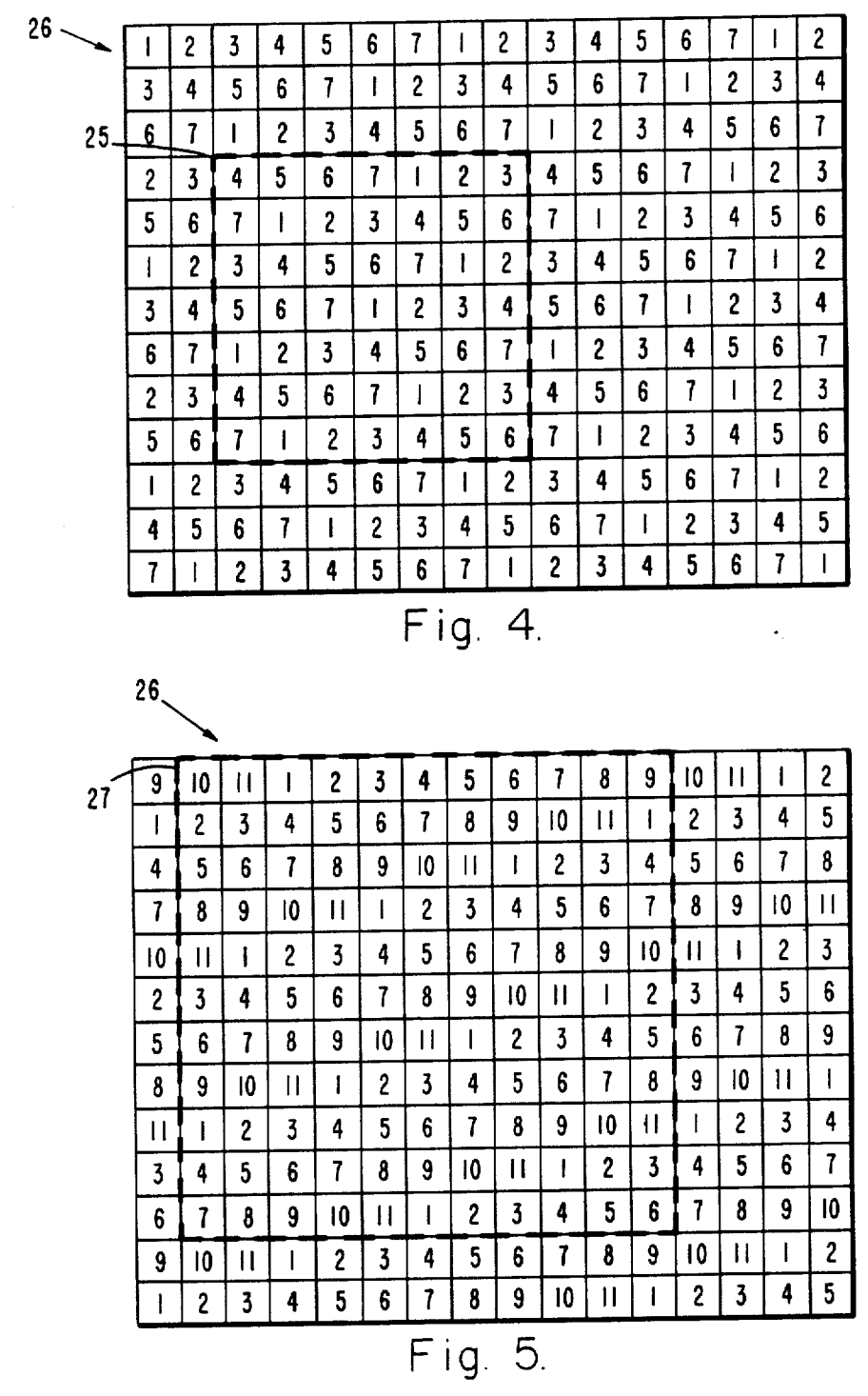

Due to the spatial aspect of the update data relative to the two dimensional grid, see envelope 28 of FIG. 4, increased efficiency, i.e., faster access time and/or the need for few rotary memory devices, can be obtained if data elements storage is distributed among the various memory devices in accordance with a predetermined arrangement. For example, with reference to FIG. 3, if the numbers 1, 2, 3 and 4 in the grid designate storing the data element associated with that grid area in rotary type memory devices 31, 32, 33 and 34, respectively, it can be seen from FIG. 3 that for each row of the grid each data element of four successive data elements is stored in a different one of said rotary type memory devices and successive groups of four elements are stored in accordance with a repetitive cyclical pattern wherein each cycle of the pattern includes four successive elements each of which is stored in a different one of said rotary data storage device. The alignment between rows (along columns) of the grid may be selected empirically. It is noted that the objective is to have the data elements within an update envelope 28 distributed as evenly as possible among the grid positions, for example see envelope 28 shown in FIG. 3.

Figures 2, 3:
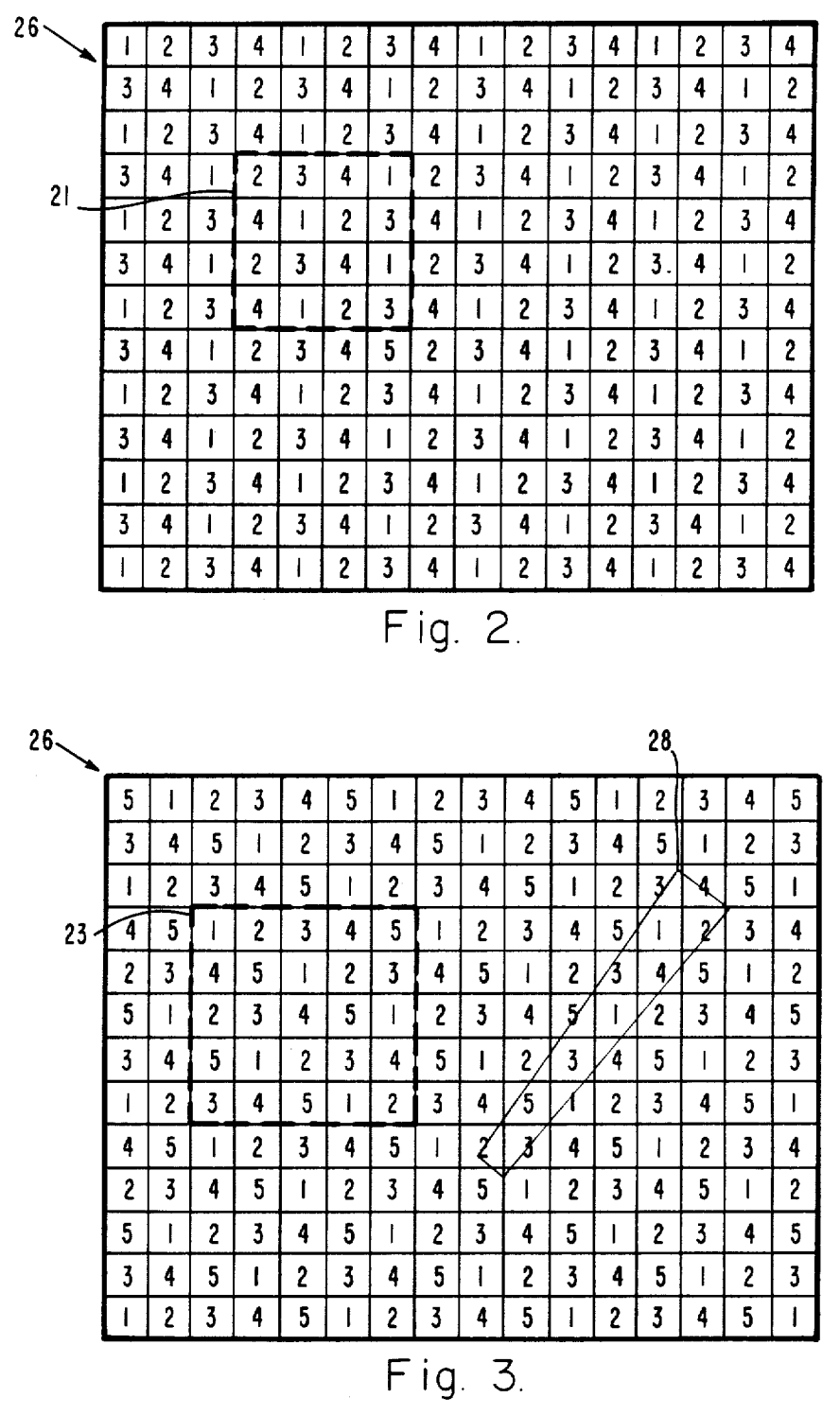

Similarly, FIGS. 3, 4 and 5 show the mapping relationship for five, seven and eleven rotary memory devices, respectively; and the mapping relationships form 5×5, 7×7 and 11×11 matrix modules as shown within the broken line areas 23, 25 and 27, respectively. As noted above, the matrixes will replicate as shown in the respective figures to cover the entire gaming area.

Although the invention has been explained herein primarily relative to CGI system applications, other applications will be apparent to those skilled in the art. For example, the invention might be used in pattern recognition systems, 3D data base systems and in regard to artificial intelligence data base management. Also it will be appreciated that any and all modifications, variations or equivalent arrangement which may occur to those skilled in the art are considered to be within the scope of the invention as defined in the following claims.

I claim:

1. A method of storing a data base of voxel or grided type data organized in accordance with a two dimensional grid comprising rows and columns of data elements, on N rotary type data memory devices suitable for storing and retrieving data so that data associated with the elements defined by the grid are distributed among various rotary memory devices in accordance with predetermined arrangements resulting in even distribution of update data thus reducing memory access time, the steps of the method comprising:

storing the data associated said data elements of each row of said grid such that each data element of N successive elements of data is stored on a different one of said rotary memory devices;

subsequently storing successive groups of said N elements in accordance with a cyclical pattern wherein each cycle of the pattern includes said N successive elements, the data for each of which is stored on a different one of said rotary type data memory devices.

2. The method of claim 1 wherein said rotary type data memory devices comprise disk type memory devices.

3. The method of claim 2 wherein said disk type memory devices comprise magnetic disk type memory devices.

4. The method of claim 3 wherein said disk type memory devices comprise optical disk type memory devices.

* * * * *